June 15, 1965 A. R. MAXEY 3,189,289

TAPE TRANSPORT

Filed Nov. 24, 1961 2 Sheets-Sheet 1

ALEXANDER R. MAXEY
INVENTOR.

BY Robert G. Clay

ATTORNEY

June 15, 1965 A. R. MAXEY 3,189,289

TAPE TRANSPORT

Filed Nov. 24, 1961 2 Sheets-Sheet 2

ALEXANDER R. MAXEY
INVENTOR.

BY Robert S. Clay

ATTORNEY

United States Patent Office 3,189,289
Patented June 15, 1965

3,189,289
TAPE TRANSPORT

Alexander R. Maxey, Redwood City, Calif., assignor to Ampex Corporation, Redwood City, Calif., a corporation of California Filed Nov. 24, 1961, Ser. No. 154,809
9 Claims. (Cl. 242—55.11)

This invention relates to tape transports, and particularly to apparatus for processing magnetic recording tape.

In the magnetic tape recording art the tape is usually stretched between a pair of supply and take-up reels and is often tensioned by means of motors applying opposite torques to the central shafts and hubs of the reels; and means are provided to sense the actual tension in the tape and to vary the motor torques as the tape is unwound from one reel and wound upon the other. Thus the tension is maintained at a constant value, permitting more perfect recording and reproduction of a signal, even though the moment arms by which the tension is applied to the tape (i.e., the radii of the tape coils on the reels) are constantly changing.

Such an arrangement has a number of disadvantages. One is that the torques and the range of torque variation of the motors must be very great, requiring large and expensive motors. Another disadvantage is that, with the reels mounted on central shafts, any eccentricity of the shaft or reel causes a cyclical variation in the length of the moment arm to the point of tangency of the tape and tape coil, with consequent variation in tape tension. Furthermore, any "wobble" of the reel, caused by misalignment of the reel axis and the actual axis of rotation, introduces difficult tape guiding problems. A still further disadvantage is that the arrangement is wasteful of space and material, such waste being of major importance in a transport that is to be used in a confined space.

In transports in which the tape is conducted out of the plane of the reel, as for crossing a rotating transducing head drum in a plane that is at an angle to the drum axis, further problems arise. Usually the tape is caused to change direction by bending it around a stationary guide post in a plane that is at an angle to the axis of the post. But this arrangement causes rapid wear of the tape, which must slide on the post not only in the direction of tape movement, but also in a direction parallel to the axis of the post. If a guide roller is used, the first-mentioned type of sliding is eliminated, but the second is not; and the tape tends to be driven toward one end of the roller, where it must be restrained by edge guides that cause even greater wear and fraying of the tape edges.

Accordingly, it is an object of the present invention to provide a tape transport in which the tape is stored on at least one reel and is maintained at constant tension even when the reel is rotating.

It is another object of the invention to provide a transport in which the torque and torque range needed for the tape tensioning motors is reduced.

It is still another object of the invention to provide a transport in which improved use is made of available space for the mounting of various components.

It is a further object of the invention to provide a transport in which wobbling of the reels is eliminated.

It is a still further object of the invention to provide a transport in which the tape is guided out of the plane of the reel with minimum sliding and wearing effect on the tape.

These and other objects of the invention are attained in a structure in which a pair of annular reels are mounted side by side on the same axis and are supported by rotating bearings applied to tracks on the outer peripheries of the reels. Thus wobble of the reels is eliminated.

The tensioning motors are coupled to various of the rotating bearings. The motors may be less powerful and may have a smaller range of torques because the mean length of the moment arm from the periphery of the reel to the outer turn of the coil of tape is smaller (for a given length of tape in the coil), and the variation in length of this moment arm from full to empty reel is over a smaller range. The tape is drawn off and returned to each reel at a point near one of the supporting bearings; and the deleterious effect of eccentricity of the reel with respect to a central supporting shaft, and of eccentricity of the shaft itself, is entirely eliminated, because of course there is no central shaft. The hollow space within the annular cavities of the reels is used for mounting other components of the transport. The tape is guided from one reel, and out of the plane of that reel, diagonally across a rotating head drum, and into the plane of the other reel, the guiding means including rollers arranged in such a way that there is no frictional sliding whatsoever of the tape in contact therewith.

Other objects and advantages will be explained in the following specification, considered together with the accompanying drawings, in which.

Figures 1, 4:
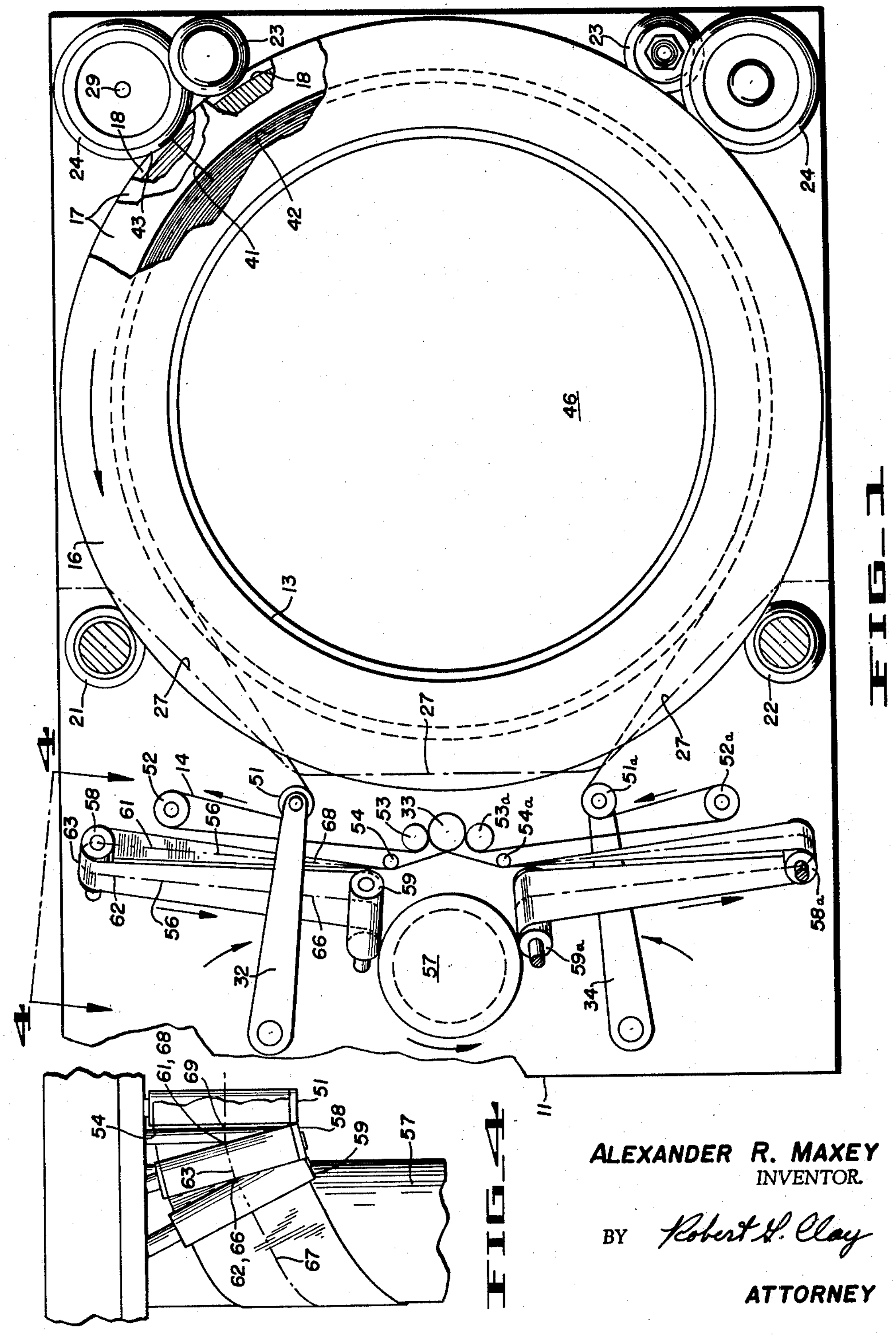
FIGURE 1 is a partly broken away front elevation view of a transport constructed in accordance with the invention.
FIGURE 4 is a substantially plan view of a portion of the apparatus shown in FIGURE 1.
Figures 2, 3:
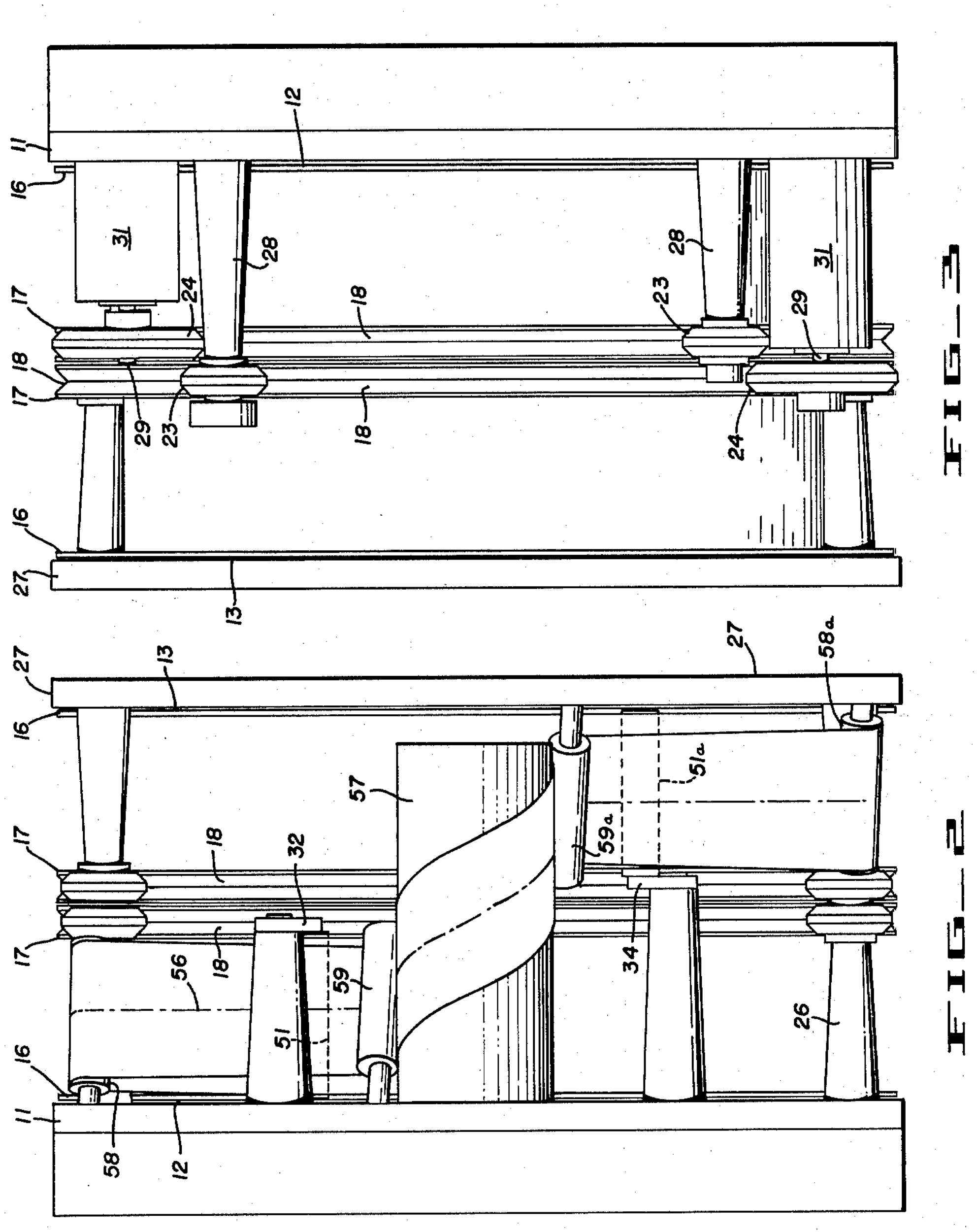
FIGURE 2 is a left end elevation view of the apparatus shown in FIGURE 1.
FIGURE 3 is a right end elevation view of the apparatus shown in FIGURE 1.

Referring now to FIGURES 1–3, there is shown a tape transport mounted on a base plate 11 and including a pair of toroidal supply and takeup reels 12 and 13 mounted side by side on a common axis and having stored in coils thereon a tape 14. Each of the reels has a pair of side flanges 16 and 17. The adjacent side flanges 17 are each formed to cylindrical or circular shape and each have a peripheral groove 18 formed therein. Each reel is supported for revolution as by means of a set of rotating bearings 21, 22, 23 and 24 spaced around the periphery of the reel and engaging the groove 18 thereof. The bearings 21 and 22 are mounted on posts 26 extending between base plate 11 and a front plate 27 (shown only in phantom in FIGURE 1). The bearings 23 are each mounted on a separate post 28 extending from the base plate 11. The bearings 24 are each mounted on the shaft 29 of a reel drive motor 31; the two motors 31 being mounted on and extending from the base plate 11.

The drive motors 24 are used primarily to tension the tape between the reels. As shown in the figures, the tape 14 extends from the supply reel 12 to a tension arm 32, and after passing around various guide elements later to be described and a capstan 33 returns to another tension arm 34 and thence to the take-up reel 13. The tape is driven primarily by the capstan 33, and the motors 24 are operated to apply torques in such a way as to tend to tension the tape between the capstand and each of the reels. The tape within the capstan loop being equal that of the supply reel. Specifically, the motor 31 that is associated with supply reel 12 is operated to tend to oppose rotation in a clockwise direction as seen in FIGURE 1 so that the supply reel 12 is urged toward a clockwise direction; and the tape between the reel and capstan is tensioned. As the capstan operates to move the tape in a forward direction, the supply reel 12 is pulled by the tape 14 in a counter clockwise direction against the holdback urging of the associated motor 31. The motor 31 that is associated with the take-up reel 13 is operated to tend to rotate in a clockwise direction so that the reel 13 is urged to rotate in a counter clockwise direction, tensioning the tape between the reel and capstan and taking up the slack as the tape is passed from the capstan. The tension arms 32 and 34 are connected through apparatus, of a type that is standard in the art and is not here shown, to sense the actual tension in the two portions of the tape and to control the torques of the motors 24 so as to maintain the tape tensions at a constant value as the amount of tape on the respective reels changes during the winding and unwinding process.

The described arrangement has several advantages. First it is noted that the torque that is applied to the tape coil for the purpose of tensioning the tape is applied through a moment arm 41 (FIGURE 1) representing the radial distance between the outer turn 42 of the tape on the reel and the periphery 43 of the corresponding motor driven bearing 24. For a given length of tape in the reel coil, it is evident that the mean or average value of the length of the moment arm 41 must be considerably les than the mean or average value of the analogous moment arm in a conventional reel, mounted on a central shaft. Thus the motor 31 of the present invention is required to exert less torque to maintain a given amount of tape at a given tension than would the motor applied to a conventional centrally mounted reel. Likewise the range of torques required of the motor 31 from the greatest to the smallest demand, or from full to empty reel, is a smaller range than would be required of a motor applied to a conventional reel. Thus great savings in motor size, weight and expense can be realized.

The arrangement of the invention is also useful in eliminating wobble such as occurs in centrally mounted reels whenever the true axis of the reel is not aligned with the true axis of rotation. It is noted that the tape 14 is taken from the supply reel 12 for example at a zone near the bearings 21, and that as a consequence the tape always leaves the reel in a precisely defined path and does not oscillate transversely as it would when leaving a centrally mounted wobbling reel. This effect has great advantage in providing for accurate guiding of the tape in its subsequent path to and beyond the transducing heads.

Concomitant with the elimination of wobble, the described arrangement also eliminates the effect of eccentricity such as is often present in reels that are mounted on a central shaft. If the reel is truly round, then the moment arm 41 existing between the outer layer of tape on the reel and the bearings 21 and 24 changes only gradually and smoothly as a function of the thickness of tape on the reel. Oscillating variation of the length of the moment arm, such as would be present in a conventional reel mounted eccentrically on its shaft, together with the corresponding variation in tension in the tape, are completely eliminated in the above-described arrangement. A further advantage of the arrangement of the invention is that space is made available within the cylindrical toroidal openings of the reels for mounting of various other components of the tape transport. For example, as shown in FIGURE 1, the entire electrical system of the tape recorder-reproducer is mounted within a cylindrical case 46 inside the inner periphery of the tape reels 12 and 13.

Referring now to FIGURE 1, the tape 14 is shown as coming from the supply reel 12, around a roller 51 at the end of tension arm 32, thence reversely around a roller 52 to a pinch roller 53. This portion of the tape passes between the pinch roller 53 and capstan 33, and passes in a clockwise direction more than 270 degrees around the capstan and to a cylindrical guide post 54. All of the elements 51–54 and the capstan 33 are mounted with their axes parallel to the axis of the reel 12, and the tape in passage to this point travels entirely in the plane of the reel 12 (i.e., with the longitudinal center line 56 of the tape lying everywhere in the same plane.)

However, it is necessary at some point to begin guiding the tape out of the plane of the supply reel, so that it may be passed diagonally across a rotating transducing head assembly 57 and returned eventually to the take-up reel 13, which lies in a different plane than the reel 12. Therefore the tape 14 leaving the post 54 is twisted about its center line 56 and passed over a roller 58 that is mounted with its axis at an angle to the plane of the reel 12. From the roller 58, the tape is further twisted about its center line 56 and passed under a roller 59 that is mounted with its axis at an even greater angle to the plane of the reel 12.

Referring now to FIGURE 4 it will be seen that the tape in passing over the rollers 58 and 59 has been diverted from the plane of the supply reel 12 and is guided in a diagonal direction over the transducing head 57.

Referring again to FIGURE 1, the tape leaving the assembly 57 is passed around a similar set of guides *59a*, *58a*, *54a*, the capstan 33, the pinch roller *53a*, a roller *52a* and a roller *51a* on the end of tension arm 34. In passage over the rollers *59a* and *58a* and the post *54a* the tape is carried into the plane of the take-up reel 13 and passes around the capstan 33 in a clockwise direction but on a different portion of the length of the capstan than that engaged by the tape coming from the supply reel. From the tension arm roller *58a*, the tape returns to the supply reel as shown.

As an important feature of the invention, the rollers 58 and 59 are each precisely inclined so that the tape in passage over either is not required to slide frictionally with respect to the roller, nor is the tape driven in such a way by the roller that it tends to migrate toward either end of the roller. This effect is accomplished by making sure that the longitudinal center line 56 of the tape in passage over each of the rollers travels always in a medial plane of the respective roller that is perpendicular to the axis of the roller. For example, with respect to the roller 58, the portion 61 of the center line 56 that is approaching the roller and the portion 62 of the center line that is leaving the roller both lie in the same plane; and this plane is the same plane as that of the portion 63 of the center line that is passing around the roller. Furthermore the plane defined by the portions 61–63 is perpendicular to the axis of the roller 58. It is not necesary that the portions 61 and 62 of the center line be parallel lines, but only that they lie in the same plane. Likewise in passage around the roller 59, the portion 66 of the center line approaching the roller lies in the same plane as the portion 67 (FIGURE 4) of the center line leaving the roller, and this plane is perpendicular to the axis of the roller 59. The same conditions are required of the tape in passage around the guide post 54: for example the portion 68 of the center line leaving the guide post 54 lies in the same plane as the portion 69 (FIGURE 4) of the center line approaching the post 54. It will be seen that with such an arrangement, the tape is in solid contact with each roller throughout its passage, and any driving forces that might exist to drive the tape toward one end of the roller or the other are balanced about the center line of the tape with the result that no movement whatsoever of the tape in an axial direction on the roller occurs.

While this arrangement does require that the tape be twisted about its center line between the rollers, and while such twisting does produce a relative stretching of the edges of the tape, the stretching may be predetermined to be less than that which would cause permanent deformation of the tape. In other words, the angles presented by the axes of the rollers with respect to the plane of the reel are selected to be sufficiently large, and the number of rollers needed to produce a desired accumulative angular displacement of the tape center line, may be selected to be sufficiently large, that the unit distortion of the tape edge never exceeds the elastic limit of the tape.

Figure 5:
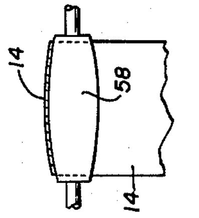
FIGURE 5 is a fragmentary figure, exaggerated in proportion to illustrate a feature of a portion of the apparatus shown in FIGURE 1.

To further reduce the unit distortion of the tape edges, the rollers 58 and 59 may be formed to a somewhat barrel shaped configuration as illustrated in FIGURE 5. The curvature of the roller 58 as illustrated in this figure is greatly exaggerated; but the principle to be followed is to form the roller to a sufficient curvature to relieve the edge deformation of the tape while yet maintaining sufficient flatness from end to end of the roller to ensure that all portions of the tape engage the roller surface in passage thereover.

Thus there has been described a tape transport in which a pair of torque reels are mounted side by side on the same axis and are supported by roller bearings engaging the peripheries of the reels, at least one of the bearings associated with each reel being coupled to a motor for tensioning the tape between the reels. From the supply reel the tape is guided over a series of rollers and a capstan to a transducing head and over another series of rollers and the capstan to a take-up reel, the tape being guided into and out of the respective planes of the reels by means of inclining various ones of the guiding rollers. The inclinations of the guiding rollers are such that the longitudinal center line of tape in passage to, over and from each roller travels in a single plane, this plane being one that is perpendicular to the axis of the roller.

What is claimed is:

1. In combination with a tape transport wherein the tape is stored in a coil and is conducted in a path away from and out of the plane of said coil, the elements comprising:

a reel for mounting said coil, said reel having a cylindrical outer periphery;

at least three rotating bearing elements engaging said cylindrical outer periphery of said reel and supporting said reel for rotation;

a plurality of tape guiding members arranged on the path of said tape so as to cause said tape to leave said reel substantially at the radial line joining one of said bearing elements and the axis of said reel;

at least two of said tape guiding members having axes that are inclined to one another in such a way that the longitudinal center line of said tape in said path passes around each of said members in a plane that is perpendicular to the axis of the respective members.

2. In a tape transport, the combination comprising:

a reel provided with a cylindrical drum portion for storing said tape in a coil;

said reel being provided with a cylindrical bearing surface concentric with said cylindrical drum portion;

at least three rotating bearing elements engaging said cylindrical bearing surface of said reel and supporting said reel for rotation; and means for guiding said tape to and from said coil out of contact with said bearing elements but substantially at the radial line joining one of said bearing elements and the axis of said reel.

3. In a tape transport, the combination comprising:

a reel provided with a cylindrical drum portion for storing said tape in a coil;

said reel being provided with a cylindrical bearing surface concentric with said cylindrical drum portion;

at least three rotating bearing elements engaging said cylindrical bearing surface of said reel and supporting said reel for rotation;

means for guiding said tape to and from said coil out of contact with said bearing elements but substantially at the radial line joining one of said bearing elements and the axis of said reel; and means for exerting rotational torque on one of said bearing means, whereby said reel is selectively driven and braked.

4. In a tape transport, the combination comprising:

a reel provided with a cylindrical drum portion and a pair of spaced disc-shaped side flanges concentric with said drum portion for storing said tape in a coil;

one of said side flanges being provided with a peripheral groove concentric with said cylindrical drum portion;

at least three rotating bearing elements engaging said peripheral groove of said one reel flange so as to support and guide said reel for rotation in the plane of said bearing elements;

means for guiding said tape to and from said coil out of contact with said bearing elements but substantially at the radial line joining one of said bearing elements and the axis of said reel; and means for exerting rotational torque on one of said bearing means, whereby said reel is selectively driven and braked.

5. A guide for web material, comprising:

a pair of members mounted for transversely engaging and guiding said web material, said members having axes that are inclined to one another in such a way that the longitudinal center line of said tape in said path passes around each of said members in a plane that is perpendicular to the axis of the respective member.

6. A guide as characterized in claim 5, wherein said members are cylindrical rollers.

7. A guide for web material, comprising:

a pair of rollers mounted for engaging and guiding said web material, each of said rollers having a circular medial section lying in a medial plane perpendicular to the axis of said roller, said medial planes of said rollers being mutually inclined so as to intersect upon a line defining a common tangent to said circular medial sections, whereby siad rollers guide said web material in such a way that the longitudinal center line of any portion of said web material tends to remain in the medial plane of the nearest of said rollers, and axial creeping of said web material on said rollers is avoided.

8. A tape transport comprising:

a pair of coaxially mounted hollow annular reels for said tape, each reel having a drum portion with an end-coil of said tape mounted thereon and a pair of side flanges extending radially outward therefrom and terminating in circular peripheries concentric to the respective drum portion;

one of said side flanges on each reel being provided with a peripheral groove;

at least three rotating bearing elements for each reel, said elements being substantially equispaced around the periphery of the respective groove reel flange and engaging the respective groove for supporting and retaining the respective reel for rotation in the plane of said bearing elements;

means for applying torques to at least one of the bearing elements associated with each reel for tensioning said tape between said reels;

a capstan mounted in axial parallelism with said reels and engaging both shanks of the loop of tape between said reels, each shank being so engaged in the plane of the reel associated therewith;

means for guiding said tape between said reels and capstan and causing said tape to leave and return to said respective reels substantially at the radial line joining an associated one of said bearing elements with the axis of the respective reel;

a rotating transducing head assembly mounted in axial parallelism with said reels and capstan and engaging said tape in the loop thereof defined by said capstan; and means for guiding said tape across said transducing head assembly with the longitudinal center line of said tape lying in a plane inclined to the axis of said head assembly, said last-named means comprising at least one roller guide mounted between said capstan and head assembly on each side of said head assembly, the axis of said roller guide being inclined to the axis of said capstan so as to cause the tape to twist about its longitudinal center line in passage between said guide and capstan and to cross said rotating head assembly in a plane that is inclined to the axis of the head assembly and to the plane of said reels, the inclination of said roller guide axis being such that said tape longitudinal center line passes around said capstan in a plane perpendicular to the capstan axis and around said roller guide in a plane perpendicular to the roller guide axis.

9. A tape transport as characterized in claim 8, wherein a plurality of roller guides are used on each side of said rotating head assembly and between said assemly and said capstan, the relation between adjacent roller guides being the same as that specified between the capstan and the roller guide mentioned in claim 8.

References Cited by the Examiner

UNITED STATES PATENTS

| | | | |
|---|---|---|---|
| 2,171,991 | 9/39 | Rall | 242—55.11 X |
| 2,362,910 | 11/44 | Littman | 242—54 X |
| 2,653,814 | 9/53 | Lorig | 226—192 |
| 2,854,235 | 9/58 | Mursch | 226—192 |
| 2,919,314 | 12/59 | Holt | 179—100.2 |
| 2,979,277 | 4/61 | Page et al. | 242—55.12 |
| 2,983,457 | 5/61 | Toro | 242—55.12 |

MERVIN STEIN, *Primary Examiner.*

JOSEPH P. STRIZAK, *Examiner.*